Patented Jan. 6, 1925.

1,521,726

UNITED STATES PATENT OFFICE.

PETRARCH AUGUSTINE GODFREY STEERUP, OF CHICAGO, ILLINOIS, ASSIGNOR TO U. S. LIGHT & HEAT CORPORATION, OF NIAGARA FALLS, NEW YORK, A CORPORATION OF NEW YORK.

ART OF PREPARING WOOD SEPARATORS FOR STORAGE BATTERIES.

No Drawing. Application filed January 11, 1918. Serial No. 211,345.

*To all whom it may concern:*

Be it known that I, PETRARCH AUGUSTINE GODFREY STEERUP, a subject of the King of Denmark, residing at Chicago, in the county of Cook and State of Illinois, have invented new and useful Improvements in the Art of Preparing Wood Separators for Storage Batteries, of which the following is a specification.

This invention relates to an improvement in the art of preparing wood separators for storage batteries.

Separators are at present prepared by treating wood in various ways for the removal of ingredients naturally present in the wood, which have a deleterious effect on the action or the parts of batteries in which they are used. In general, in the commercial processes now in use, the wood is subjected to treatment in a wet way with the result that the finished separator cannot be subsequently dried without warping, shrinking, cracking or checking in such fashion as to render it useless. These objectionable conditions are not met with where the separators are prepared and placed immediately in the batteries. In common practice, however, it is desirable to prepare the separators in quantities and have them on hand ready to place in a battery in the final step of assembling. The present practice requires the separators to be kept wet from the time of treatment until they are placed in the finished battery and the electrolyte added. Also, in certain cases, batteries are shipped or stored in a dry state, that is, without the electrolyte. Furthermore, separators are often shipped as spare or repair parts of batteries, or are kept on hand in battery repair shops or service stations, since the life of a wood separator is much shorter than that of the other parts of the battery and it is often necessary to replace the separators without returning the battery to the factory. It is obvious that the shipping or storing of separators which must be kept moist is troublesome and expensive. Shipment in the wet state, as is now done, is expensive, not only because the separators in that condition weigh approximately twice as much as when dry, with a proportionate increase in transportation charges, but also because it is necessary to take great care in packing in order that they may be shipped in very hot or very cold weather without danger of damage from either drying or freezing. It is obvious, therefore, that it would be highly advantageous if such separators could be prepared or treated in a fashion that would make it possible to ship them and store them in dry state.

An object of the present invention is to so prepare separators which have been previously treated to remove deleterious matter, that they may be stored or shipped in a dry state without deterioration.

In practice, the separator may be previously treated by any of the usual processes, such as treatment with acids, alkalies, peroxide, steam or water, this treatment being carried out in the usual commercial manner until a satisfactory product is obtained in the wet state. This wet treated separator, made by any of the known processes, is then immersed in a solution of a suitable crystalline substance which should be water soluble and preferably should have no deleterious action on the battery, although a crystalline substance which does have a deleterious action on the battery may be used if it is completely leached out before the separators are put into service. This crystalline substance should preferably be one having a high percentage of water of crystallization. The separators are left in this solution for a sufficient length of time to allow them to become thoroughly impregnated with it. They are then removed from the solution and allowed to dry, either by mere exposure to the air or by application of heat in kilns or other suitable devices, until they feel dry to the touch. If at this point they are slightly warped, as they sometimes are if certain chemical treatments now in commercial use have been followed in the preparation of the separators, they may be placed in a press for a time in order to straighten them, after which they may be kept indefinitely without fear of further shrinkage or deterioration. The only further treatment which they require is soaking in water sufficiently to remove the impregnating crystalline substance previously to being placed in position in the battery.

One method by which storage battery separators have been prepared is as follows:

Wood separators which have previously been treated by extraction with caustic soda solution are immersed in a boiling saturated solution of sodium sulphate for a sufficient time to cause them to be properly impregnated. At the end of this period, they are removed from the solution, allowed to drain, placed in such position that the air of the room may readily come into contact with all of their surfaces and allowed to remain exposed to the air at ordinary room temperature until they feel dry to the touch. They are then placed in piles under slight pressure until thoroughly dried, after which they may be stored for an indefinite time without injury. When it is desired to use them in batteries, they are treated with water until substantially all of the sodium sulphate has been removed, when they are ready for use in the usual manner.

It will be understood that this method is one especially adapted to the treatment of separators prepared by the caustic soda method. The impregnation step of this invention will vary with different woods and with different methods of treatment to which the separators have been subjected in the initial preparation prior to the impregnating process. Thus, with certain milder forms of treatment now in commercial use, or with comparatively hard woods, the use of pressure during the final drying step is wholly unnecessary, as after impregnation, the separators may be dried without any warping or deterioration whatsoever. It is also true that in some cases elevated temperatures may be used in drying, whereas in other cases where the treatment has been more severe, as with caustic soda, air at room temperature is preferable. Also, in certain cases it might be found preferable to form the impregnating solution in situ by impregnating first with alkali and subsequently neutralizing with acid or by following these steps in reverse order.

It is obvious that other modifications in the process may be made and the advantages of the improved process realized to greater or less extent, without departing from the scope of the invention which is defined in the appended claims.

What I claim as new and desire to secure by Letters Patent of the United States, is:—

1. The process of treating a wood separator from which deleterious substances have been removed, which consists in filling the pores of the separator with a readily soluble crystalline substance.

2. The process of treating a wood separator from which deleterious substances have been removed, which consists in filling the pores of the separator with a water soluble crystalline substance.

3. A process of treating wood storage battery separators by impregnating them with sodium sulphate.

4. A process of preparing wood storage battery separators for storage or shipment which consists in impregnating in dry state which has been previously treated a separator which has been previously treated by a wet treatment to remove the deleterious substances, with sodium sulphate, drying the separator and removing the impregnating substance before placing the separator in use.

5. A process of preparing wood storage battery separators for dry shipment or storage which consists in subjecting the separator which has been previously treated by a wet process to a hot saturated solution of sodium sulphate until thoroughly impregnated and thereafter exposing the separator to the air until thoroughly dried.

6. A storage battery separator consisting of a thin diaphragm of wood from which natural constituents deleterious to the action of the storage battery have been removed, impregnated with a water soluble crystalline substance.

In witness whereof, I have hereunto subscribed my name.

PETRARCH AUGUSTINE GODFREY STEERUP.